Sept. 3, 1968 R. D. HEIN 3,399,907
ELASTOMERIC ENERGY ABSORBER
Filed Aug. 2, 1966 2 Sheets-Sheet 1

INVENTOR
Richard D. Hein
Frank J. Earnheart
BY James A. Lucas
ATTORNEYS

Sept. 3, 1968            R. D. HEIN            3,399,907

ELASTOMERIC ENERGY ABSORBER

Filed Aug. 2, 1966            2 Sheets-Sheet 2

INVENTOR
Richard D. Hein

BY Frank J. Earnheart
James A. Lucas

ATTORNEYS

United States Patent Office 3,399,907
Patented Sept. 3, 1968

3,399,907
ELASTOMERIC ENERGY ABSORBER
Richard D. Hein, Wabash, Ind., assignor to The General Tire & Rubber Company, a corporation of Ohio
Filed Aug. 2, 1966, Ser. No. 569,653
13 Claims. (Cl. 280—440)

ABSTRACT OF THE DISCLOSURE

This invention relates to an energy absorber utilizing a layer of elastomeric material, and more particularly relates to a spring which employs the principles of shear and compressive deformation of an elastomer to absorb load energies imposed on the spring.

Background of invention

The list of uses for elastomeric materials is almost endless, these uses being dependent upon the varied and many desirable properties of the elastomer. These elastomeric materials can be compounded from a countless variety of formulations and in a myriad of different ways resulting in products having optimum physical characteristics and properties. The various aspects of this compounding technology are within the knowledge of the skilled rubber compounder. Because of the inherent ability of rubber and other elastomers to be compressed and flexed, these elastomers have found wide use particularly in the field of energy absorption. Examples of energy absorbers that use elastomers are dock fenders, vehicle bumpers, bushings and mountings.

Description of invention

It is one object of this invention to utilize the energy absorbing properties of rubber-like elastomers to make a novel energy absorber having an adjustable spring rate.

Another object is to produce a spring or energy absorber which utilizes the high shear and compression energies of an elastomer to accomplish its objectives.

Yet another object of this invention is a shear spring which uses a plurality of pivot arms to subject a pad or layer of elastomeric material to the combination action of shear and compression when loads are applied in a direction perpendicular to the plane of the pad, said spring being useful for, among other purposes, a king pin suspension for large trucks.

These as well as other objects are accomplished in a manner to be hereinafter described with particular reference to the attached drawings in which.

This invention relates to a deformable elastomeric energy absorbing pad comprising a pair of substantially parallel planar surfaces and means for accommodating loads applied in a direction generally normal to said surfaces, said means adapted to urge said surfaces together to compress the elastomer and at the same time to move said parallel surfaces away from one another to subject the elastomer to shear.

More particularly, this invention relates to an energy absorber comprising a layer of elastomeric material bonded between a pair of generally parallel plate members. These plate members are pivotally mounted so as to move parallel to one another but in opposite directions, under load, thereby subjecting the intermediate elastomeric layer to shear. The plates also tend to move toward one another to subject the elastomer to compressive forces.

Figure 1:
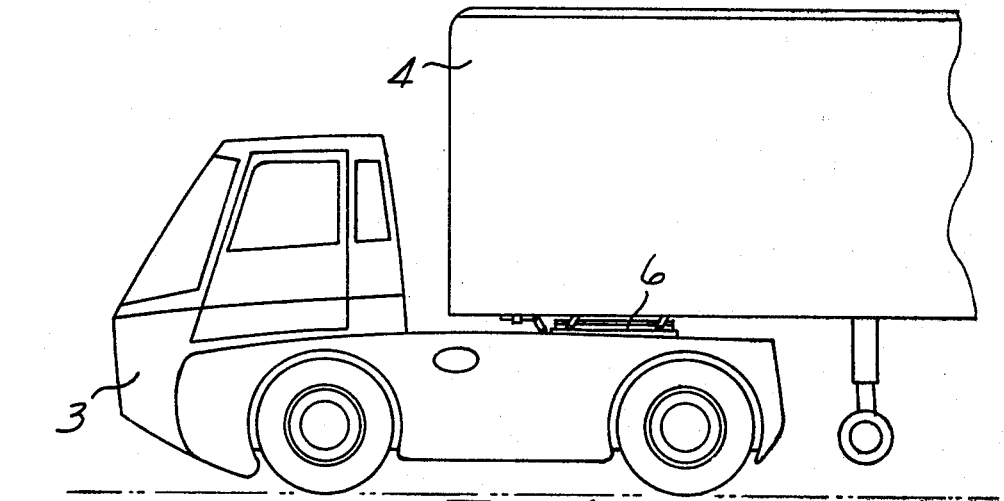
FIGURE 1 shows a portion of a truck tractor and semi-trailer with one of the energy absorbers of the present invention interposed therebetween.

Referring now to FIGURE 1, there is shown a truck comprising a tractor having a cab 3 mounted thereon, and a trailer 4 attached to the tractor. The trailer is connected to the tractor by a king pin suspension of conventional design, modified by the utilization of a shear spring 6 of the type covered by the present invention, which spring is mounted to the underside of the trailer 4 or, alternatively, to the frame of the tractor.

Figure 2:
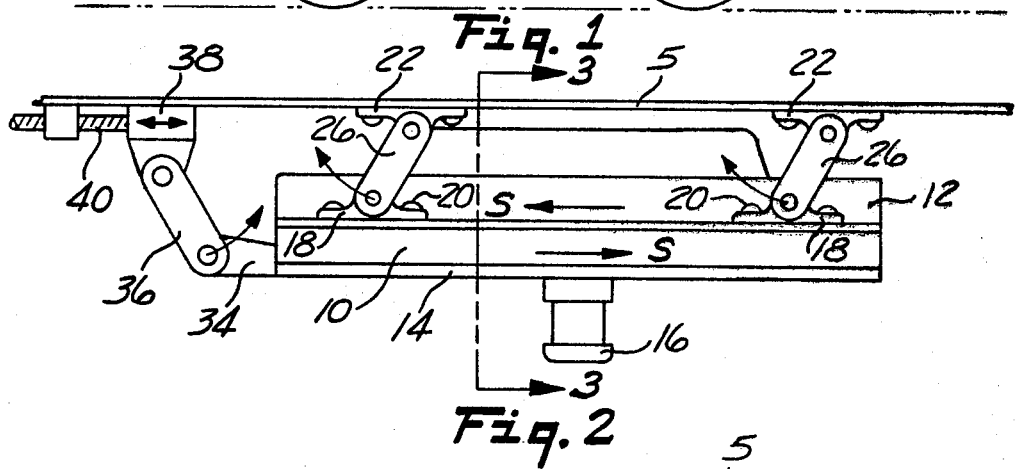
FIGURE 2 is a side view of one embodiment of the novel shear spring suitable for use in an application such as that shown in FIGURE 1.
Figure 3:
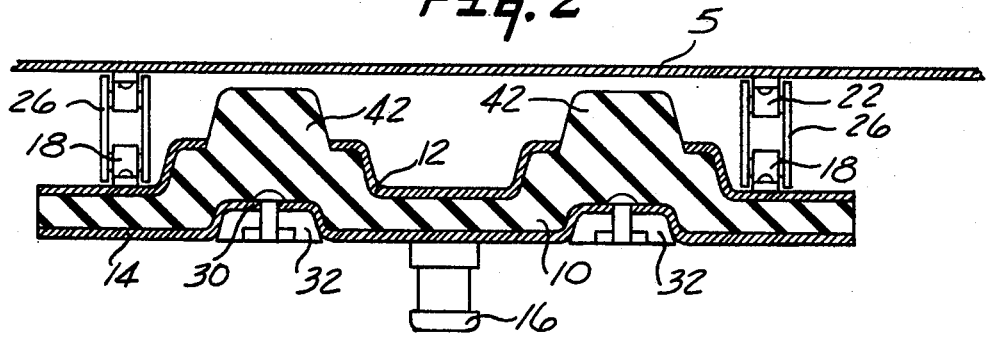
FIGURE 3 is a cross-sectional view taken along lines 3—3 of FIGURE 2.

The details of one type of energy absorbing device which can be used with the truck shown in FIGURE 1 is seen in FIGURES 2 and 3. This device consists of a layer 10 of elastomeric material bonded between or otherwise adhered to a pair of parallel plates, an upper plate 12 and a lower plate 14. Connected to the lower plate is a king pin 16 of conventional design which is adapted to engage a suitable slot in a mounting plate or skid plate on the back frame of the tractor. A plurality of pivot arms 26 are each pivotally connected by a pair of brackets 18, 22 to the top plate 12 and the underside 5 of the trailer. Chain links are typically used as the pivot arms.

Two channels 30 are formed in the lower plate 14 and are adapted to receive an elongated bracket 32 bolted or otherwise secured in place. One end of each bracket extends beyond the end of the plate and terminates in a projection 34 which is pivotally engaged with one end of a pivot arm 36, equal in length to the pivot arms 26. The other end of each arm is pivotally connected to an adjustable bracket 38 which rides in a slot (not shown) on the underside 5 of the trailer 4. A threaded rod 40 attached to the bracket 38 is provided with a handle (not shown) or other rotating means and is adapted to move bracket 38 toward or away from brackets 22.

The upper plate 12 is provided with a pair of rectangular cut-out portions through which a portion of the elastomer 10 extends to form overload cushions 42. As the truck, particularly when heavily loaded, passes over unusually large bumps, these cushions contact the bottom of the trailer to serve as an overload protection device and to prevent damage to the king pin and shear spring.

Figure 4:
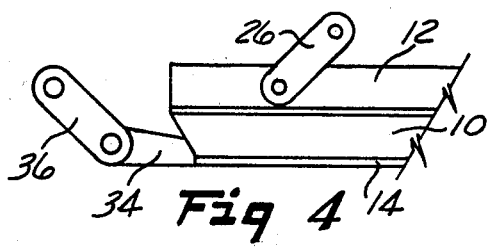
FIGURE 4 is a partial cross section of FIGURE 2 showing the spring under load.

The various lever arms are arranged so that under no load conditions they all form an equal angle with the direction of the applied load. Because this angle is greater than 0°, a load P, applied vertically to the king pin, causes the lever arms to exert a moment about their respective pivot points. The upper arms 26 tend to rotate in a clockwise direction about bracket 22 while the lower arms 36 have a tendency to pivot counterclockwise about adjustable bracket 38. The upper plate 12 is thereby urged to the left and the lower plate 14 tends to move in the opposite direction. This composite action causes the elastomer 10, sandwiched between the two plates 12 and 14, to be compressed and sheared as shown in FIGURE 4. The combination compression-shear force is resisted by the restorative tendency of the elastomer and, at equilibrium, balances the forces applied by the vertical load.

As previously stated, the two handles can be turned to move the adjustable brackets 38 toward or away from brackets 22 attached to the trailer 4, thereby changing the no load angle that is formed between the various pivot arms and the vertical direction. As this angle approaches zero, the spring becomes noticeably stiffer under load due to the greater amount being absorbed by compression. The natural frequency of the spring thus increases, thereby resulting in a relatively harsh feel or ride. Conversely, as the angle becomes greater, more load is absorbed by shear and the natural frequency of the spring decreases, thereby resulting in a softer ride and a low spring rate, useful when traveling with a light or empty load. When subjected to overload conditions, the spring undergoes a very small amount of additional deflection despite a rapid increase in the magnitude of the applied load inasmuch as the overload cushions 42 absorb the additional load in compression.

Figure 5:
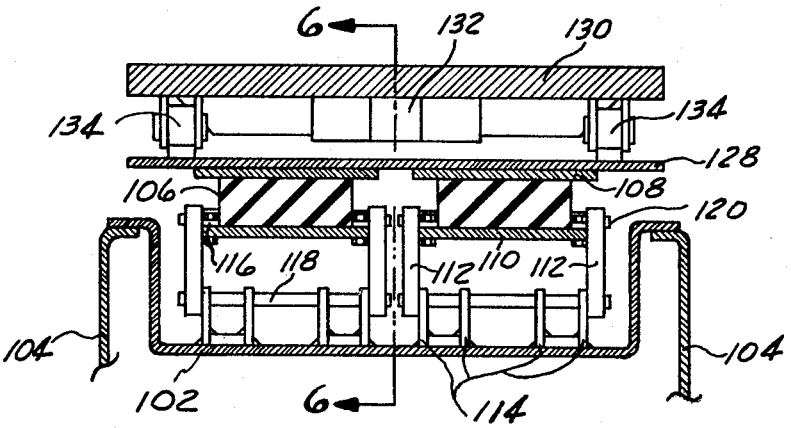
FIGURE 5 is a cross-sectional view showing another embodiment of a king pin suspension unit.
Figure 6:
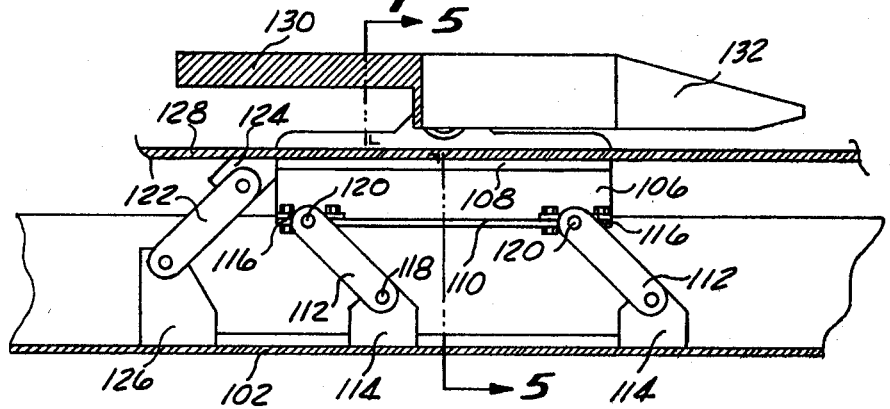
FIGURE 6 is a view taken along lines 5—5 of FIGURE 5.

Referring now to FIGURES 5 and 6, there is shown another embodiment of the present invention which differs from that shown in FIGURE 2 in certain respects, but yet utilizes the principle of combined shear-compression deformation of a layer of elastomeric material to absorb load energies. Unlike the suspension system shown in FIGURE 2 which was attached directly to the underside of the trailer, the modification of FIGURES 5 and 6 is adapted to be mounted on the frame of the tractor. Accordingly, a rigid steel pan 102 is supported between a pair of channels 104 forming the body frame of a tractor. Two separate shear units are positioned within the pan, each unit comprising an elastomeric layer 106 sandwiched between and bonded to a pair of plates, an upper plate 108 and a lower plate 110. Clamped to each of the lower plates by brackets 116 are a plurality of pins 120. One end of a pivot arm 112 is rotatably engaged with each pin, the other end connected to a rod 118 passing through brackets 114 and secured thereby to the pan 102. Means such as low friction sleeves or lubricated inserts are preferably provided to prevent binding of the pins in the lever arms. These lever arms are adapted to pivot about pins 120 and rod 118 in a counterclockwise direction upon the imposition of a vertical load on the assembly. A pair of linking arms 122 (one being shown) adapted for clockwise rotation under load are pivotally attached to the upper plate 108 of each unit by a suitable bracket 124 and to the pan by another bracket 126. The upper plates of both units are welded, bolted, or otherwise fastened to another plate 128 on top of which the trailer mounting plate 130 is attached. This mounting plate is provided with a king pin receiving slot 132 and is pivotally connected to the plate 128 by a pair of rugged pivot posts 134.

In operation, this unit is similar to the previously described unit. When a vertical load is applied to the unit, such as that imposed by the weight of the trailer on the mounting plate or by the truck passing over a bump in the road, a counterclockwise moment is imposed on the pivot arms 112 and a clockwise moment on arms 122 thereby causing upper plate 108 and lower plate 110 to move parallel to one another but in opposite directions. This then causes the elastomeric layer 106 to be deformed in compression and shear until the forces of restoration of the elastomer overcome the combined deformation forces.

Figure 7:
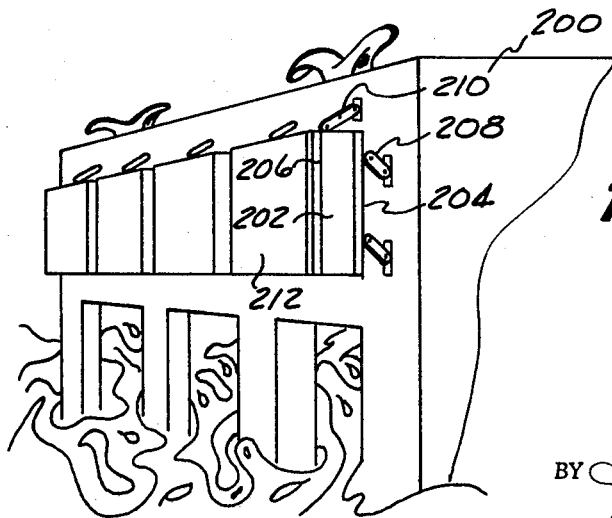
FIGURE 7 shows a plurality of shear spring energy absorbers installed on a dock or pier.

FIGURE 7 shows a number of the shear springs of the type described in this invention spaced along the vertical side of a dock 200 to accommodate the heavy load applied when a ship comes into contact with the dock. These springs each consist of a layer of elastomeric material 202 sandwiched between and bonded to a pair of parallel plates, a bottom plate 204 and a top plate 206. The bottom plate is attached to the dock 200 by four lever arms 208, two of which are shown. The top plate 206 is attached to the dock 200 by a pair of lever arms 210. A layer of wear resistant material 212 covers the surface of the top plate 206 and serves to protect the energy absorbing device from abrasion and wear caused by constant contact with ships and large vessels. This layer can be composed of, for example, a low friction material such as polyurethane bonded or otherwise attached to the plate 206.

When a ship contacts one of these units and exerts an inwardly directed force against the dock, the arms 210 urge the top plate 206 in a downward direction and the arms 208 urge the bottom plate 204 in an upward direction. The movement of these two plates causes the layer of elastomer 202 bonded therebetween to be subjected to compression and shear, the amount of deformation being proportional to the force with which the ship contacts the device. The magnitude of the deformation and the corresponding cushioning effect of the energy absorbing devices are also dependent upon the angle which the lever arms 208, 210 make with the respective plates.

In still another embodiment of this invention, the spring can be permanently mounted between a pair of spaced apart structures as a means of cushioning one from the other. In such an installation one shear surface of the elastomer is pivotally connected to one structure and the other surface is similarly connected to the other structure. However, in such an installation, all of the lever arms are parallel to one another, extending in the same direction with regard to the applied load, and they all move in the same angular direction when a load is applied to urge the two structures together.

Various modifications and alterations can be made in the construction of the spring of this invention without departing from the scope thereof. For instance this spring, with a soft spring rate, can be used as a suspension system for seats on equipment such as tractors and earth moving equipment. Furthermore, this novel spring can be utilized in many other applications wherein it is desirable to protect a structure from damage caused by loads applied gradually or rapidly thereagainst. Also, this shear spring can be used as the principal suspension system for vehicles wherein a readily adjustable spring rate is desirable and obtainable.

Any one of a number of different elastomers may be used to carry out the teachings of this invention, the ultimate selection being dependent upon such factors as the ability of the elastomer to recover from repeated deformation and the various environmental conditions under which the elastomer will operate. Included in this list of elastomers are neoprene, natural rubber, butyl rubber and various copolymers such as styrene butadiene rubber, ethylene propylene rubber, etc. These elastomers are typically compounded with various fillers and reinforcing agents such as carbon black as well as plasticizers and curing aids according to techniques well known to those skilled in the art. After compounding, the elastomer is formed into suitable shape as by molding under high pressure and is thereafter cured. The elastomer can be bonded to the shear plates during molding and curing or can alternatively be bonded to the plate with a suitable adhesive or the like.

In the preferred embodiment of the invention, heavy metal, e.g. steel, shear plates are used, said plates being sufficiently strong so that they do not normally deform or bend during normal usage. It should be understood, of course, that the shear plates do not necessarily have to be of metal but instead can be fabricated from various plastic materials and the like.

The number of lever arms that can be used with this device as well as their length, size, and method of attachment are all dependent upon a variety of factors such as size of the unit, size of the anticipated load, etc. Correspondingly, the position of the lever arms is likewise dependent upon the number of arms that are being used and is based primarily upon the equitable distribution of load to the shear plate.

Under most conditions it has been found that the lever arms should form a no load angle of between about 25° and 85°, and preferably between about 40° and 70°, with the direction of the applied load. As previously explained, decreasing this angle causes the spring to become noticeably stiffer and results in an increase in the spring rate while conversely the spring rate frequency decreases and the spring becomes more yielding as the angle is increased.

In addition to changing the angle of the lever arms, there are other methods of varying the spring rate properties of the shear spring. For example, a stiffer spring can be produced by decreasing the thickness of the elastomeric layer between the shear plates or by increasing the shear area of the rubber.

In a typical load deflection curve of this spring, the applied load initially increases relatively sharply with comparatively little deflection, i.e., displacement of one shear plate toward the other, after which the spring undergoes a period of increased deflection with substantially little decrease in the applied load. The first portion of curve appears to represent the predominant effects of compression whereas the latter portion of the curve represents the increasing effect of shearing of the elastomer. As the no load angle between the lever arms and the load direction is increased, the transition from compression to shear occurs at a lower load level and the spring rate correspondingly decreases.

It is contemplated that other variations can be made in carrying out the teachings of this invention without departing from the scope thereof which is limited by the following claims.

I claim:
1. An elastomeric suspension system for use between the tractor and trailer of a semi-trailer vehicle comprising upper and lower substantially parallel rigid plates separated by and bonded to a layer of elastomeric material, first pivot means pivotally attached to the upper plate and second pivot means pivotally attached to the lower plate, both of said pivot means pivotally connected to a portion of one of said trailer or said tractor and forming an equal but opposite angle to one another, as measured from a vertical plane whereby a load applied to said suspension system causes the pivot means to concomitantly move the plates toward one another and parallel to one another in opposite directions to subject the elastomeric layer to a combination of compressive and shear deformation.

2. The system according to claim 1 wherein each of said pivot means comprises a plurality of parallel pivot arms, with each arm having one of its ends pivotally attached to its respective plate and the other end attached to said tractor or trailer.

3. The system according to claim 2 wherein all of the parallel pivot arms are of equal length.

4. A system according to claim 2 wherein the suspension system is mounted in between the frame of said tractor and the fifth wheel of the tractor.

5. The system according to claim 4 wherein the upper plate is secured directly to the fifth wheel and the pivot arms are connected to the frame of the tractor.

6. The system according to claim 2 wherein the system is secured between the king pin and the trailer.

7. The system according to claim 6 wherein the lower plate is connected directly to the king pin, and one end of the pivot arms is pivotally attached to the underside of the trailer.

8. The system according to claim 2 wherein the underside of the trailer is provided with means adapted to move one set of pivot arms toward or away from the other set for varying the angle that the pivot arms form with the vertical plane.

9. The system according to claim 2 including overload protection means consisting of at least one elastomeric overload cushion adapted to contact the underside of the trailer, said cushion comprising an integral part of said elastomeric layer.

10. An energy absorption device comprising at least one layer of elastomeric material having a pair of generally parallel opposed surfaces secured respectively to first and second rigid plates and arranged substantially normal to the direction of an applied load, first pivot arms each having one end connected to the structure to be protected and having the other end connected to said first rigid plate and second pivot arms each having one end connected to said structure and the other end connected to said second rigid plate, all of said arms forming an acute angle with the direction of the applied load, said first arms forming an equal but opposite angle, with respect to the direction of the applied load, to said second arms whereby said rigid plates are urged toward one another to compress the elastomeric material therebetween and in parallel but opposite directions to subject said material to shear upon the application of a given load to said device.

11. An energy absorption device interposed between separate spaced apart structures comprising at least one layer of elastomer having a pair of generally parallel opposed surfaces secured respectively to first and second rigid plates and arranged generally normal to the direction of an applied load, first pivot arms each having one end connected to said first rigid plates and the other end connected to one of said structures and second pivot arms with their ends joined respectively to said second rigid plate and the other of said structures, all of said arms being parallel to one another and forming an acute angle with the direction of the applied load, whereby said rigid plates are urged toward one another to compress the elastomeric material therebetween and in parallel but opposite directions to subject said material to shear upon the application of a given load to said device.

12. A resilient spring comprising at least one layer of elastomeric energy absorbing material confined between a pair of parallel plates and first pivot arms having one end attached to the first of said parallel plates and second pivot arms having one end attached to the second of said parallel plates, said first arms forming an acute angle with the direction of the load to be applied to the spring and said second arms forming an equal but opposite angle with respect to said load whereby said elastomeric material is subjected to a combination of compression and shear upon application of a load to said layer, and whereby the ratio of compression to shear decreases upon continued deflection of the elastomeric layer.

13. The spring according to claim 12 including means to vary the angle of the pivot arms to change the initial compression-shear ratio.

References Cited

UNITED STATES PATENTS

| | | | |
|---|---|---|---|
| 2,202,436 | 5/1940 | Siebler et al. | 267—21 |
| 2,202,615 | 5/1940 | Barenyi | 267—21 |
| 2,863,674 | 12/1958 | Baade | 280—439 |
| 2,920,905 | 1/1960 | Cekada et al. | 280—440 |

FOREIGN PATENTS 716,563  10/1954  Great Britain.

LEO FRIAGLIA, *Primary Examiner.*